US009057351B2

(12) United States Patent
Thomas et al.

(10) Patent No.: US 9,057,351 B2
(45) Date of Patent: Jun. 16, 2015

(54) METHOD AND SYSTEM FOR ENGINE CONTROL

(75) Inventors: Joseph Lyle Thomas, Kimball, MI (US); Alex O'Connor Gibson, Ann Arbor, MI (US); Xiaoying Zhang, Dearborn Heights, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 697 days.

(21) Appl. No.: 13/402,569

(22) Filed: Feb. 22, 2012

(65) Prior Publication Data
US 2013/0218441 A1    Aug. 22, 2013

(51) Int. Cl.
*F02D 41/30* (2006.01)
*F02N 11/08* (2006.01)
*F02D 41/06* (2006.01)
*F02D 41/40* (2006.01)
*F02P 5/15* (2006.01)
*F02D 41/00* (2006.01)
*B60W 30/194* (2012.01)
*F02D 41/22* (2006.01)
*B60W 30/18* (2012.01)

(52) U.S. Cl.
CPC .......... *F02N 11/0825* (2013.01); *F02D 41/065* (2013.01); *F02D 41/3029* (2013.01); *F02D 41/401* (2013.01); *F02D 41/402* (2013.01); *F02P 5/1506* (2013.01); *F02D 41/0002* (2013.01); *F02D 2041/001* (2013.01); *F02D 2041/224* (2013.01); *F02D 2200/0802* (2013.01); *Y02T 10/44* (2013.01); *Y02T 10/46* (2013.01); *Y02T 10/48* (2013.01); *Y02T 10/42* (2013.01); *B60W 30/18018* (2013.01); *B60W 30/194* (2013.01); *B60W 2530/12* (2013.01); *B60W 2710/0627* (2013.01)

(58) Field of Classification Search
CPC ............ F02N 11/0814; F02N 11/0825; F02D 41/221; F02D 41/065; F02D 41/401; F02D 41/402; F02D 41/0002; F02D 1/02; F02D 19/08; F02D 2041/001; F02D 2041/224; B60W 10/06; B60W 10/10; B60W 30/194; B60W 2710/0627
USPC ............ 123/179.4, 179.16, 179.17, 299, 479, 123/495, 114.41; 701/103, 105, 107, 113
See application file for complete search history.

(56) References Cited

U.S. PATENT DOCUMENTS

| | | | |
|---|---|---|---|
| 6,024,064 A * | 2/2000 | Kato et al. | 123/179.17 |
| 6,446,609 B2 * | 9/2002 | Mizuno et al. | 123/479 |
| 7,185,627 B2 * | 3/2007 | Shibagaki | 123/308 |

(Continued)

OTHER PUBLICATIONS

Basmaji, Joseph et al. "Fuel System for a Multi-Fuel Engine," U.S. Appl. No. 12/984,538, filed Jan. 4, 2011, 56 pages.

*Primary Examiner* — Thomas Moulis
*Assistant Examiner* — Elizabeth Hadley
(74) *Attorney, Agent, or Firm* — Julia Voutyras; Alleman Hall McCoy Russell & Tuttle LLP

(57) ABSTRACT

Methods and systems are provided for restarting an engine when a high pressure fuel pump is degraded. In response to an indication of high pressure fuel pump degradation, fuel may be injected during an intake stroke, rather than a compression stroke, for a selected number of combustion events since the engine restart. By shifting to an intake stroke injection, the engine may be started even when sufficient fuel rail pressures are not available.

10 Claims, 6 Drawing Sheets

(56) References Cited

U.S. PATENT DOCUMENTS

| | | |
|---|---|---|
| 7,931,002 B1 | 4/2011 | Gibson et al. |
| 8,091,530 B2 | 1/2012 | Surnilla et al. |
| 2011/0137543 A1 | 6/2011 | Gibson et al. |
| 2012/0048242 A1 | 3/2012 | Surnilla et al. |
| 2012/0143478 A1* | 6/2012 | Kim ............... 701/104 |
| 2013/0002210 A1* | 1/2013 | Gibson et al. ............. 322/7 |

* cited by examiner

METHOD AND SYSTEM FOR ENGINE CONTROL

TECHNICAL FIELD

The present application relates to methods and system for operating an engine with a high pressure fuel pump.

BACKGROUND AND SUMMARY

Direct injection fuel systems may be used to deliver at least a portion of a desired amount of fuel to an engine for combustion. Such direct injection fuel systems may include a high pressure fuel pump, in addition to a low pressure fuel pump, upstream of a fuel rail to raise a pressure of the fuel delivered to the engine cylinders through the direct injectors. In vehicle start/stop systems configured to perform an idle-stop when idle-stop conditions are met and automatically restart the engine when restart conditions are met, the high pressure pump may also be used to compression inject fuel into one or more cylinders and restart the engine. In particular, during engine restart conditions, the high pressure pump may be used to provide sufficient injector pressure to force fuel into the selected cylinders during a compression stroke, thereby reducing engine restart times as well as restart engine speed flares.

However, the inventors herein have identified potential issues with such systems. As one example, during conditions when the high pressure fuel pump is degraded, the fuel rail pressure may be reduced to a lower level corresponding at least to the low pressure fuel pump. If the high pressure pump is degraded at the time of engine restart, the reduced pressure level may not be sufficient to force the fuel into the cylinder during the compression stroke. As a result, no combustion may occur during cranking and the starter may fault. If the high pressure pump degrades during the run up (e.g., after the first or second combustion event during the run up), an engine stall may occur. Engine misfire events may also be possible. As such, the overall engine restart response may be degraded. The effects may be exacerbated in vehicle start/stop systems due to the higher frequency of engine restarts from idle-stop conditions.

Thus at least some of the above issues may be addressed by a method of operating an engine comprising, during an engine cold start condition, direct injecting fuel into a first firing cylinder during an intake stroke independent of a state of a high pressure fuel pump coupled to the engine to restart the engine. In this way, engine startability can be improved even if the high pressure fuel pump is degraded.

In one example, during an engine restart, it may be determined if a high pressure fuel pump is degraded. If so, fuel may be injected into the first firing cylinder (e.g., the first cylinder to reach TDC after the engine starts to rotate) during the intake stroke. For example, the fuel injection may be shifted from multiple injections in the compression stroke to a single injection in the intake stroke. Optionally, direct fuel injection during the intake stroke may be maintained for a number of combustion events since the engine start. In one example, the intake stroke injection may be maintained until a threshold engine speed is reached (e.g., until an idling speed is reached). While direct injecting during the intake stroke, a spark timing may be retarded. However, a lower amount of spark retard may be applied for the intake stroke injection relative to a corresponding compression stroke injection, to reduce the engine speed flare while providing combustion torque. Likewise, while direct injecting during the intake stroke, a smaller alternator load may be applied on the engine relative to the corresponding compression stroke injection, to reduce restart NVH issues and improve vehicle launch smoothness. Still other throttle, valve timing, transmission gear, etc. adjustments may be performed in coordination with the intake stroke injection to improve engine restart in the presence of a degraded high pressure fuel pump.

In this way, by injecting fuel in the intake stroke during an engine restart, in response to an indication of high pressure pump failure, sufficient injector pressure may be developed to force fuel into the first firing cylinder. As such, this improves engine restartability and reduces the likelihood of engine stalls and misfires. By adjusting one or more engine parameters while injecting the fuel during an intake stroke, engine speed flares and NVH issues associated with an engine restart can also be addressed. Overall, an engine may be restarted even if a high pressure pump is degraded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
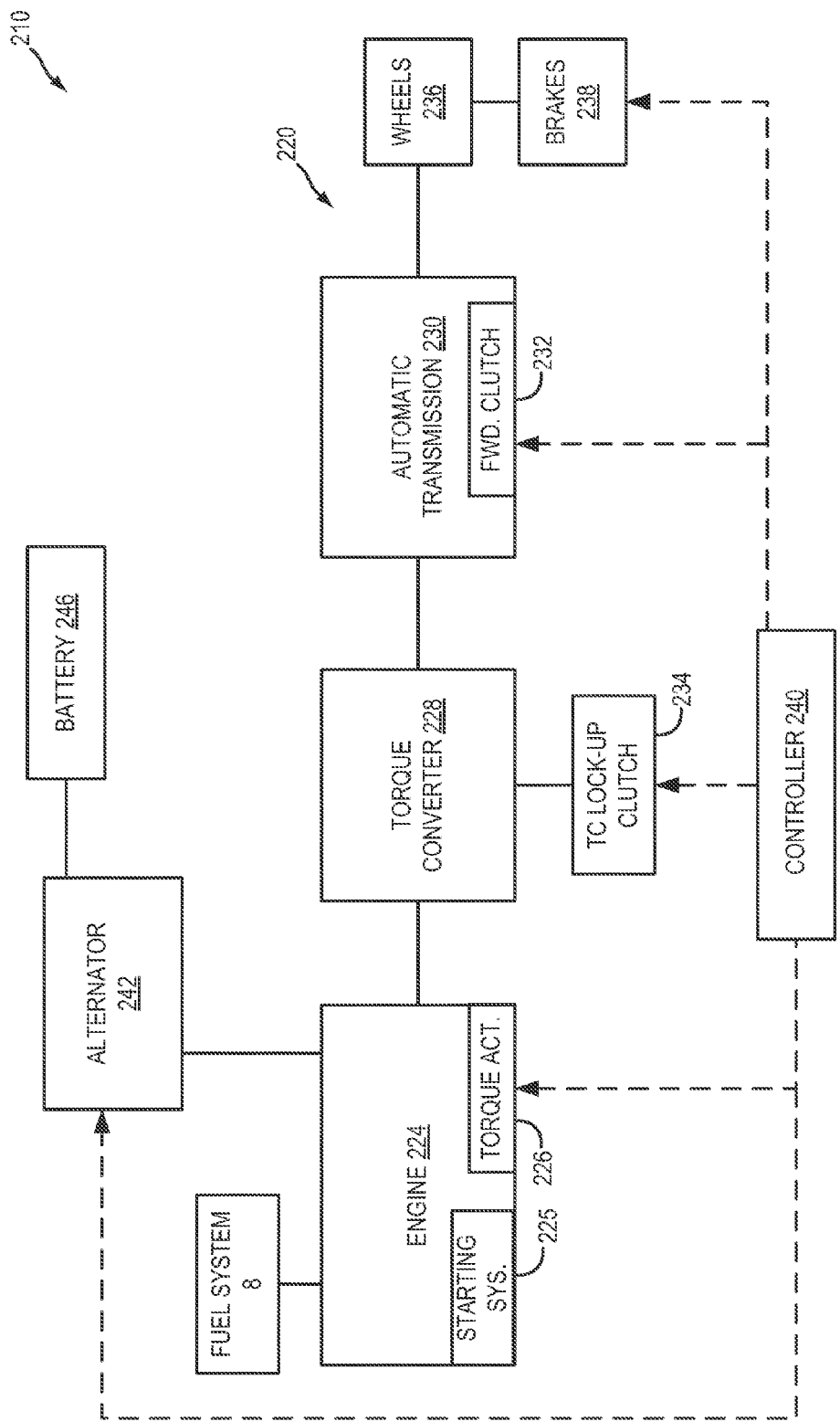
FIG. 2 shows a schematic depiction of an example engine system that may be selectively deactivated in response to idle-stop conditions.
Figure 3:
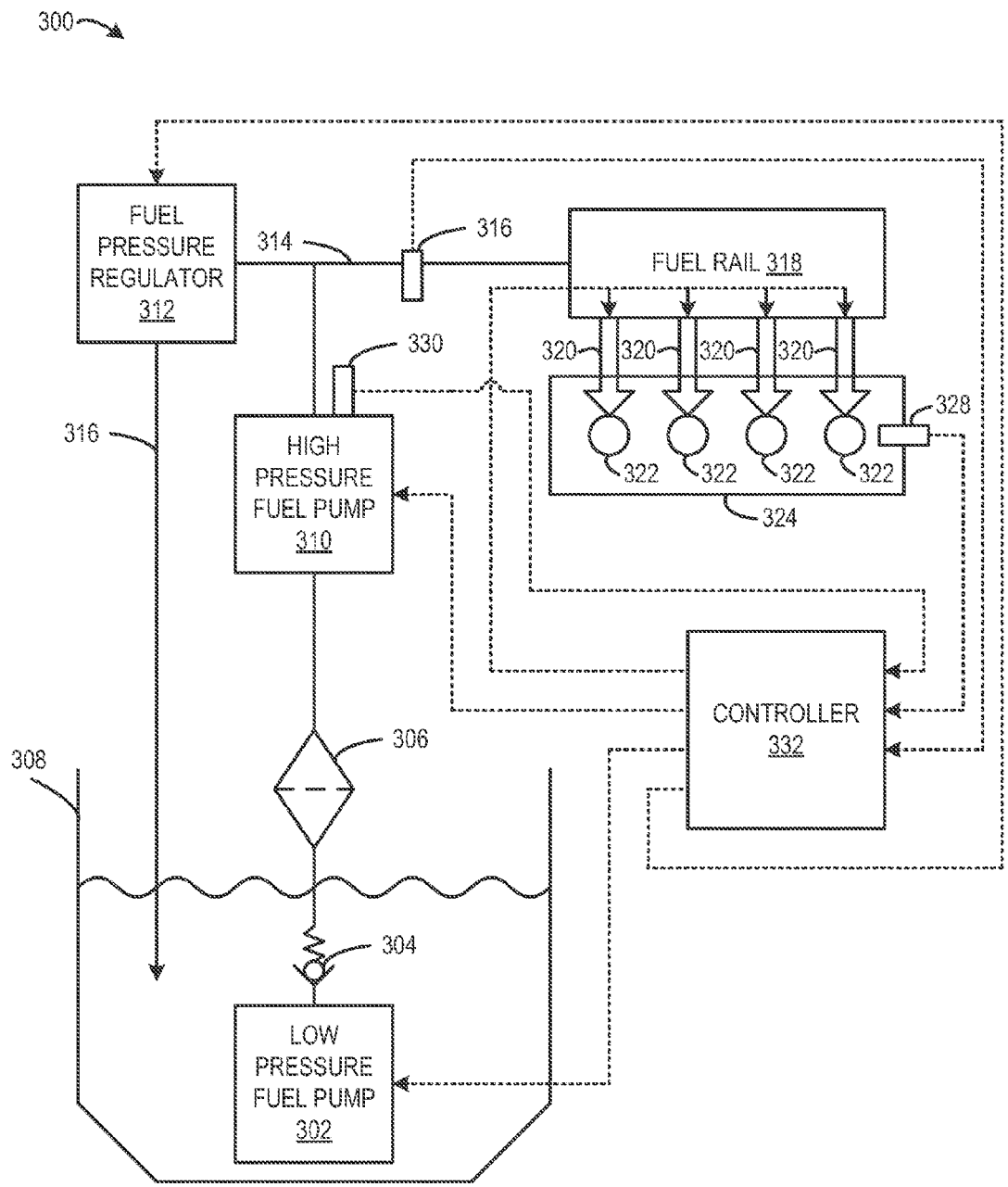
FIG. 3 shows a schematic depiction of a fuel system including a high pressure fuel pump coupled to the engine system of FIGS. 1 and 2.

Methods and systems are provided for adjusting engine operations in an engine system (such as the engine systems of FIGS. 1 and 2) configured to receive fuel via a high pressure fuel pump (such as the fuel system of FIG. 3). An engine controller may be configured to adjust engine operations during an engine restart based on whether the high pressure fuel pump (HPP) is functional or degraded. The controller may be configured to perform a control routine, such as the routine depicted in FIG. 4, during an engine cold start, to inject fuel into the first firing cylinder in the intake stroke, and then either maintain the fuel injection in the intake stroke for at least an additional number of combustion events (such as, in response to a degraded HPP) or shift injection to the compression stroke (such as, in response to a functional HPP). The controller may also be configured to perform a control routine, such as the routine depicted in FIG. 5, during an engine restart from idle-stop conditions, to perform a single intake stroke fuel injection (such as, in response to a degraded HPP) or perform a multiple compression stroke fuel injection (such as, in response to a functional HPP). An example fuel injection adjustment is shown in FIG. 6. Based on which stroke the fuel injection is made in, engine operating parameters, such as throttle opening, valve timing, spark timing, alternator load, etc., may also be adjusted during the restart. By shifting fuel injection from a compression stroke to an intake stroke during an engine restart, in response to an indication of high pressure pump degradation, sufficient injector pressure may be developed to force fuel into the first firing cylinder, improving engine startability.

Figure 1:
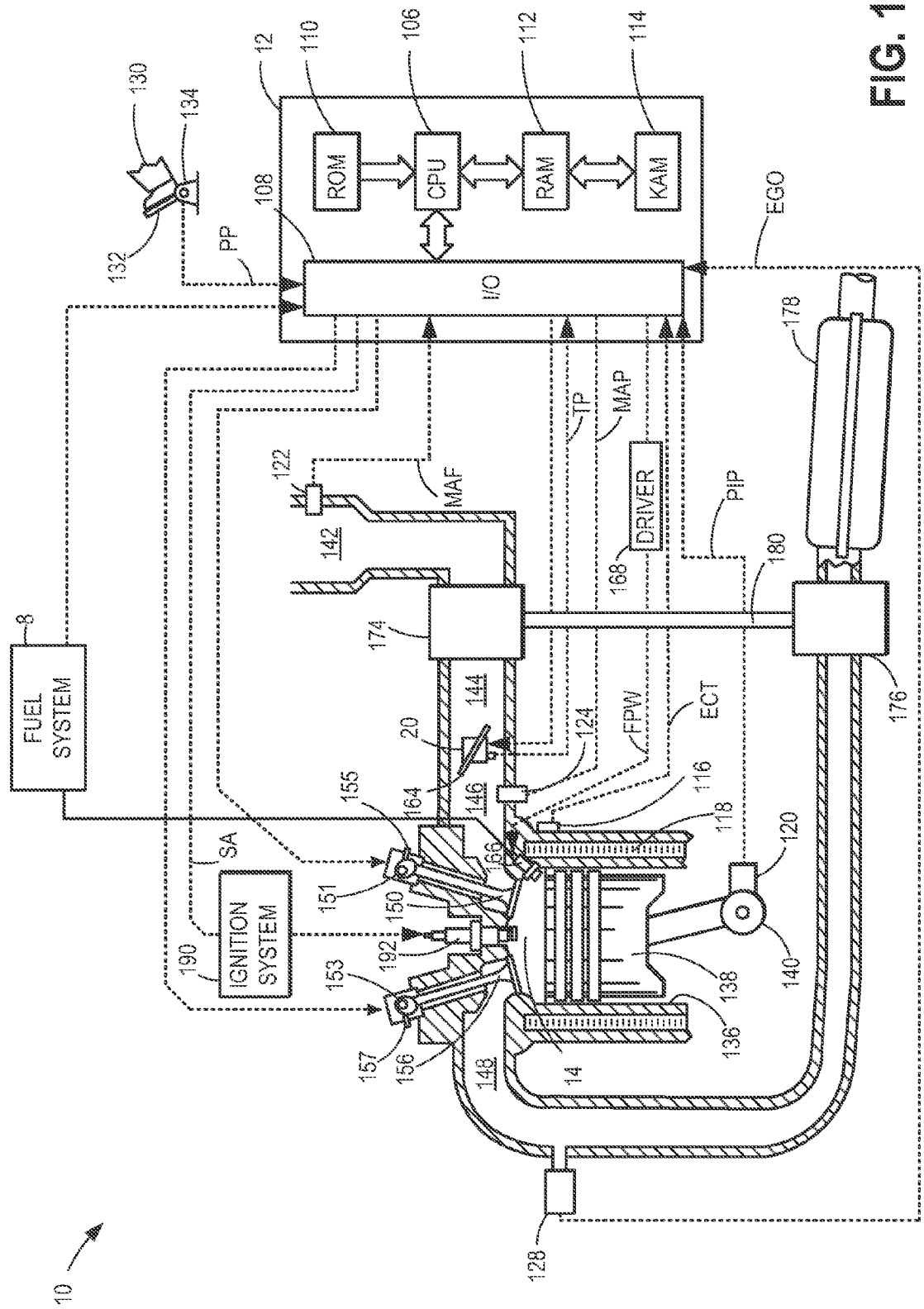
FIG. 1 shows a schematic depiction of an example engine system.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. One example of such a fuel system is shown in FIG. 3.

It will be appreciated that, in an alternate embodiment, injector 166 may be arranged in intake passage 146, rather than in cylinder 14, in a configuration that provides what is known as port injection of fuel (hereafter referred to as "PFI") into the intake port upstream of cylinder 14.

In one embodiment, cylinder 14 may include only a single fuel injector that is configured to receive different fuels from the fuel system in varying relative amounts as a fuel mixture, and is further configured to inject this fuel mixture either directly into the cylinder as a direct fuel injector or upstream of the intake valves as a port fuel injector. In alternate embodiments, the engine may be operated by using two injectors (a direct injector and a port injector) and varying a relative amount of injection from each injector.

Fuel may be delivered by injector 166 to cylinder 14 during a single cycle of the cylinder. Further, the distribution and/or relative amount of fuel delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As an example, during an engine restart, fuel may be injected into a cylinder during a compression stroke. By performing compression direct fuel injection, a higher air-charge temperature and higher valve temperature of the engine cylinders during the compression stroke may be advantageously used to more effectively evaporate the directly injected fuel. In particular, for fuels with a relatively low volatility (such as alcohol fuels), the compression stroke injection may allow the fuel to be exposed to higher air-charge temperatures, thereby better enabling efficient evaporation and formation of a homogenous air-fuel mixture. As such, this improves the startability of the engine.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel tanks in fuel system 8 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

FIG. 2 shows a block diagram layout of a vehicle system 210, including a vehicle drive-train 220. Drive-train 220 may be powered by engine 222. Engine 224 may be configured to receive fuel from fuel system 8 including various fuel tanks, pumps, and valves, as elaborated with reference to FIG. 3. Engine 224 may be configured to operate on one or more fuels such as gasoline, ethanol, combinations thereof, diesel, etc. Engine 224 may be started with an engine starting system 225, including a starter. In one example, the starter may include an electrical motor. The starter may be configured to support engine restart at or below a predetermined near zero threshold speed, for example at or below 50 rpm, or 100 rpm. Torque of engine 224 may be adjusted via torque actuator 226, such as a fuel injector, throttle, etc. Additionally, in the case of a hybrid vehicle, the powertrain may be used to slow or increase engine speed as desired.

An engine output torque may be transmitted to torque converter 228 to drive an automatic transmission 230. In some examples, the torque converter may be referred to as a component of the transmission. The output of the torque converter 228 may be controlled by torque converter lock-up clutch 234. When torque converter lock-up clutch 234 is fully disengaged, torque converter 228 transmits torque to automatic transmission 230 via fluid transfer between the torque converter turbine and torque converter impeller, thereby enabling torque multiplication. In contrast, when torque converter lock-up clutch 234 is fully engaged, the engine output torque is directly transferred via the torque converter 228 clutch to an input shaft (not shown) of transmission 230. Alternatively, the torque converter lock-up clutch 234 may be partially engaged, thereby enabling the amount of torque relayed to the transmission to be adjusted.

Torque output from the automatic transmission 230 may in turn be relayed to wheels 236 to propel the vehicle. Specifically, automatic transmission 230 may adjust an input driving torque at the input shaft (not shown) responsive to a vehicle traveling condition before transmitting an output driving torque to the wheels. For example, transmission torque may be transferred to vehicle wheels 236 by engaging one or more clutches, including forward clutch 232. As such, a plurality of such transmission clutches may be engaged, as needed. Further, wheels 236 may be locked by engaging wheel brakes 238. In one example, wheel brakes 238 may be engaged in response to the driver pressing his foot on a brake pedal (not shown). In the same way, wheels 236 may be unlocked by disengaging wheel brakes 238 in response to the driver releasing his foot from the brake pedal.

Vehicle system components outside of the drivetrain may include an alternator 242, and a battery 246. Additional auxiliary loads (not shown) may include lights, radio system, HVAC systems (for heating and/or cooling a vehicle cabin), etc. Alternator 242 may be configured to convert the mechanical energy generated while running engine 224 to electrical energy for storage in battery 246. Alternator 242 may include a field coil (not shown). As such, when a current is applied to the alternator field coil 242, the coil is energized, and accordingly a load is applied on the engine 224. The rotating engine 224, mechanically coupled to the alternator, causes current to flow in the stator of alternator 242.

In one example, as depicted, engine 224 may be configured to be selectively (and automatically) shut down when idle-stop conditions are met and restarted when restart conditions are met. One or more auxiliary loads may be maintained, for example, at 12V, even when the engine is off The power to maintain the auxiliary loads operational when the engine is shut down may be provided, at least in part, by battery 246, one or more additional batteries (e.g., one or more additional smaller batteries), and/or a DC/DC converter (not shown). In one example, a DC/DC converter based device, such as a voltage quality module (VQM) or a voltage stability module (VSM) (not shown) may be electrically coupled between battery 246 and alternator 242 and may be configured to provide a regulated DC voltage output from a DC voltage input (or power source), such as battery 246. The output of the DC/DC converter may be applied to the various auxiliary loads including the alternator field coil circuit.

Figure 4:
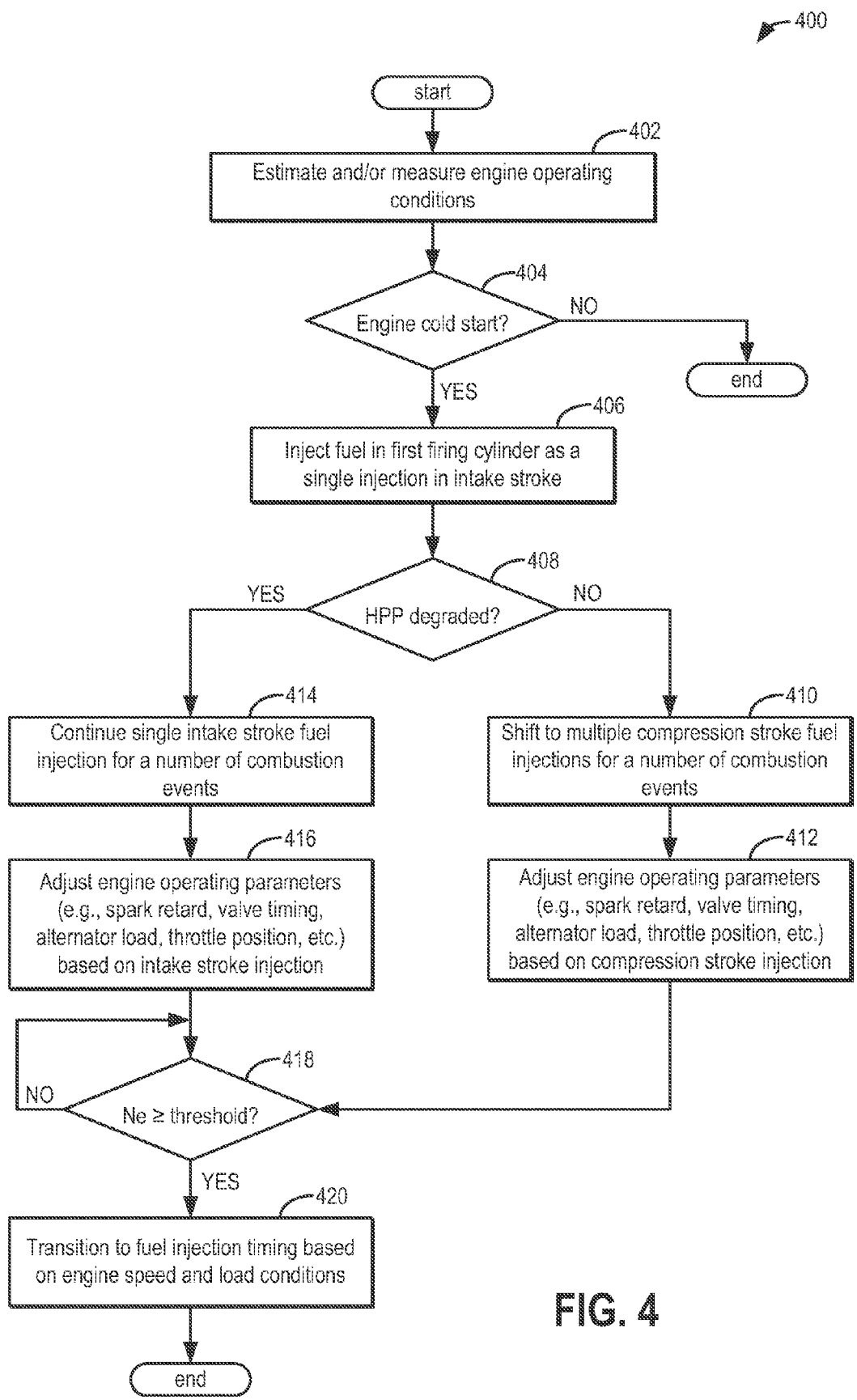
FIG. 4 shows a high level flow chart for adjusting fuel injection to an engine cylinder during an engine cold start based on a state of the high pressure fuel pump.
Figure 5:
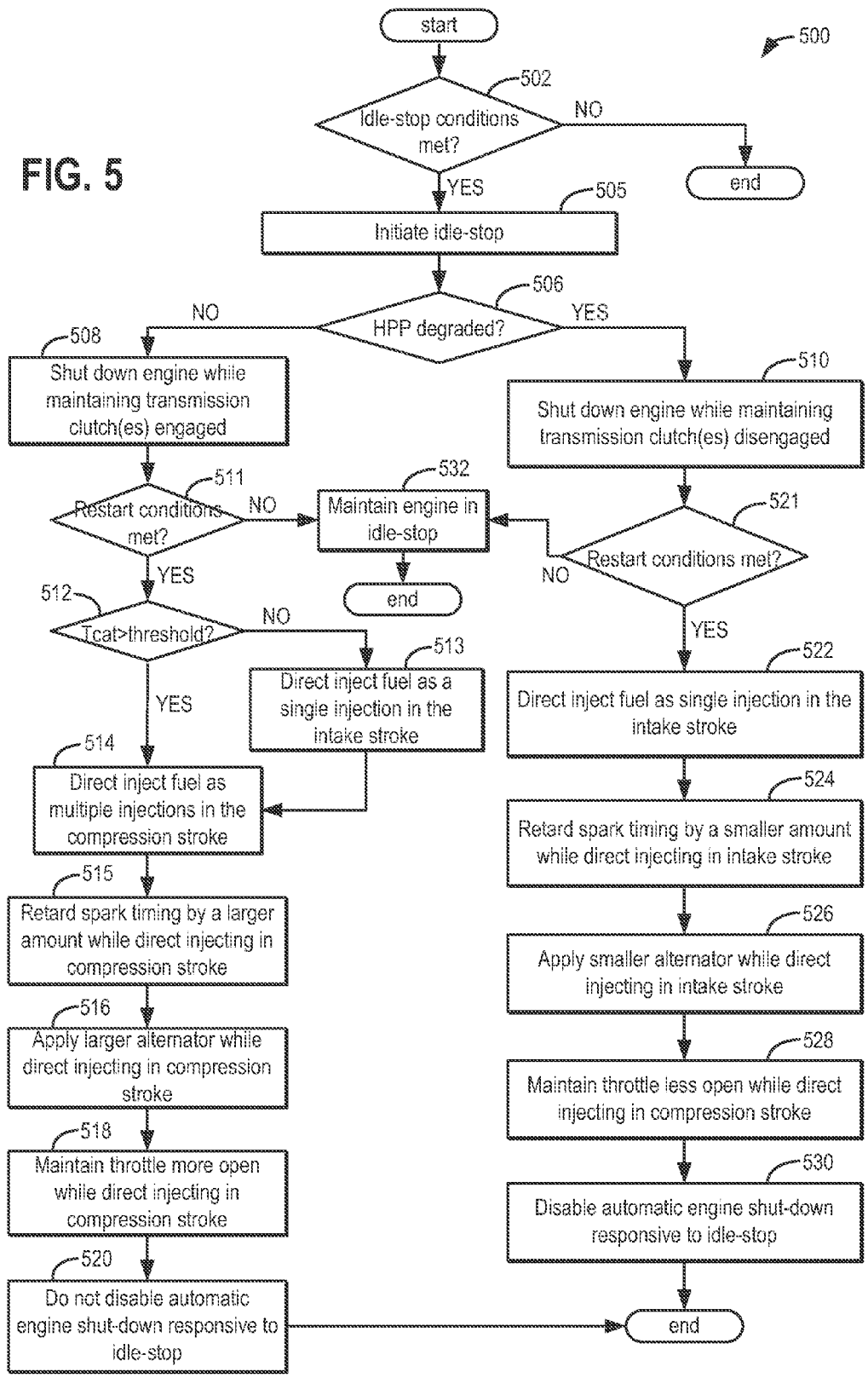
FIG. 5 shows a high level flow chart for adjusting engine idle-stop and restart operations responsive to an indication of high pressure fuel pump degradation.
Figure 6:
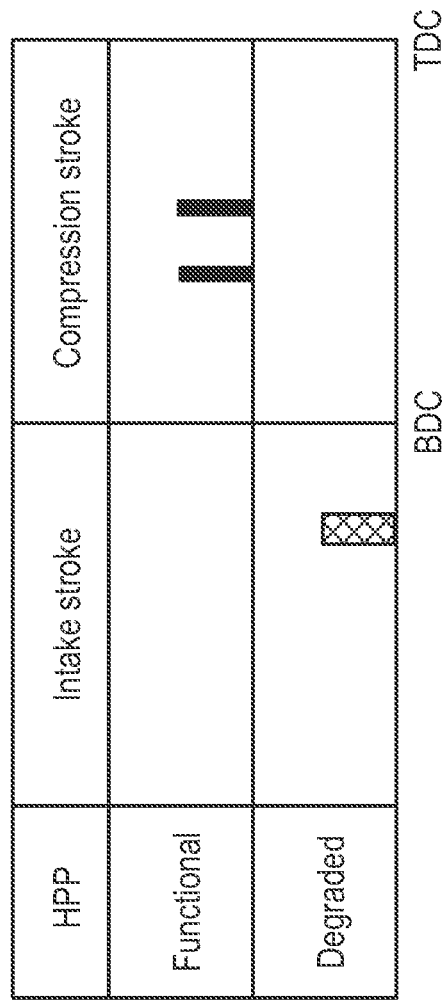
FIG. 6 shows an example fuel injection adjustment responsive to an indication of high pressure fuel pump degradation.

As elaborated in FIGS. 4-5, during an engine restart, an alternator load may be applied on the engine, for example, by adjusting a current applied to the alternator field coil. Controller 240 may be configured to receive inputs from engine 224 and accordingly adjust a mechanical load applied to the engine via the alternator by adjusting a current supplied to the alternator field coil. As one example, an engine start speed profile may be selected, and the controller may adjust a current supplied to the alternator field coil based on a difference between actual engine speed and a desired engine speed profile. In this way, it is possible to adjust a load applied to an engine via an alternator mechanically coupled to the engine during engine starting so that engine speed can be controlled to a desired engine speed.

Controller 240 may also adjust an engine torque output by adjusting a combination of spark timing, fuel pulse width, fuel pulse timing, and/or air charge, by controlling throttle opening and/or valve timing, valve lift and boost for turbo- or super-charged engines. In the case of a diesel engine, controller 240 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied (e.g., when the vehicle is idling and engine operating parameters are within a desired range), controller 240 may selectively shut down the engine, for example, by controlling operation of drivetrain and/or accessory components. As elaborated in FIG. 5, the controller may maintain one or more transmission clutches engaged or disengaged during the engine shutdown, based on a state of a high pressure fuel pump coupled to the fuel system 8 of engine 224. Similarly, when engine restart conditions are met, such as when the vehicle is already in an idle-stop and one or more engine operating parameters are outside the desired range, controller 240 may selectively restart the engine by powering the starter using a battery. As elaborated in FIG. 5, the controller may maintain one or more transmission clutches engaged or disengaged during the engine restart, based on a state of a high pressure fuel pump coupled to the fuel system 8 of engine 224. Further, controller 240 may use engine torque actuators along with making adjustments to current supplied to an alternator field coil to control engine speed during engine starting. By controlling engine torque actuators and the load applied to the engine via the alternator it may be possible to reduce engine speed flares during engine starting.

FIG. 3 shows a schematic depiction of a fuel system 300 configured to deliver fuel to an internal combustion engine that utilizes direct injection (DI) for use in a vehicle. In one example, fuel system 300 is an example embodiment of fuel system 8 of FIGS. 1-2. Fuel system 300 may include each of a first, high pressure fuel pump (HPP) and a low pressure fuel pump (LPP) to deliver fuel to the engine 324. Specifically, fuel system 300 includes low-pressure fuel pump 302 to pump liquid fuel from fuel tank 308. In this embodiment, fuel pump 302 is an electronically controlled variable speed lift pump. In some cases, low-pressure fuel pump 302 may only operate at a limited number of speeds. It will be appreciated that the fuel tank may contain any fuel suitable for an internal combustion engine such as gasoline, methanol, ethanol, or any combination thereof.

Low-pressure fuel pump 302 is fluidly coupled to check valve 304 to facilitate fuel delivery and maintain fuel line pressure. In particular, check valve 304 includes a ball and spring mechanism that seats and seals at a specified pressure differential to deliver fuel downstream. In some embodiments, fuel delivery system 300 may include a series of check valves fluidly coupled to low-pressure fuel pump (LPP) 302 to further impede fuel from leaking back upstream of the valves. Check valve 304 is fluidly coupled to filter 306. Filter 306 may remove small impurities that may be contained in the fuel that could potentially damage vital engine components.

Fuel may be delivered from filter 306 to high-pressure fuel pump 310. High pressure fuel pump 310 may increase the pressure of fuel received from the fuel filter from a first pressure level generated by low-pressure fuel pump 302 to a second pressure level higher than the first level. High pressure fuel pump 310 may deliver high pressure fuel to fuel rail 318 via fuel line 314. In one example, high pressure fuel pump is a volumetric displacement fuel pump.

Fuel pressure regulator 312 may be coupled in line with fuel line 314 to regulate fuel delivered to fuel rail 318 at a set-point pressure. To regulate the fuel pressure at the set-point, fuel pressure regulator 312 may return excess fuel to fuel tank 308 via return line 316. It will be appreciated that operation of fuel pressure regulator 312 may be adjusted to change the fuel pressure set-point to accommodate operating conditions.

Fuel rail 318 may distribute fuel to each of a plurality of fuel injectors 320. Each of the plurality of fuel injectors 320 may be positioned in a corresponding cylinder 322 of engine 324 such that during operation of fuel injectors 320 fuel is injected directly into each corresponding cylinder 322. Alternatively (or in addition), engine 224 may include one or more port fuel injectors positioned at the intake port of each cylinder such that during operation of the fuel injectors fuel is port injected in to the intake port of each cylinder. In, the illustrated embodiment, engine 224 includes four cylinders. However, it will be appreciated that the engine may include a different number of cylinders.

As previously elaborated, during an engine restart (such as an engine restart from idle-stop conditions), fuel may be injected into a cylinder during a compression stroke. To enable direct injection of fuel into the cylinder during a compression stroke, a fuel rail pressure may be raised by operating the high pressure fuel pump. During conditions when high pressure fuel pump 310 is degraded, the fuel rail pressure may drop to the level of the low pressure fuel pump (e.g., from 500-700 psi to 50-60 psi). The high pressure fuel pump may be degraded due to, for example, an electrical fault. One common high pressure fuel pump electrical fault may include shorting to ground that causes the high pressure pump's electric circuit to fault and the rail pressure to go to the low pressure fuel pump circuit's pressure. As another example, the high pressure fuel pump may be degraded due to a leak in a high pressure regulator. As such, if the leak is small enough, a low pressure regulator may compensate. However, if the leak is too large, there may not be sufficient fuel pressure in the rail (e.g., no fuel rail pressure). The high pressure pump may be mechanically driven off an engine cam, wherein the number of cam lobes is engine specific. For example, on an I4 engine, there may be 1 lobe/cylinder, while on a V6 engine, there may be 1 lobe/2 cylinders. In either case, there is an electronically controlled valve that controls the flow through the high pressure pump. High pressure pump degradation may also be caused if this valve fails to actuate. In particular, if the valve fails to actuate, the fuel rail pressure of the high pressure pump may typically go to the low pressure pump output of ~50-60 psi.

At the low pressure level resulting from high pressure fuel pump degradation, there may not be sufficient injector pressure to force fuel into the cylinder during a compression stroke. That is, compression stroke injection may not be possible. When this occurs during an engine restart, no combustion may occur and the engine will crank until the starter degrades. Likewise, if the high pressure fuel pump degradation occurs after the first or second combustion event (since the engine restart), during engine run-up, an engine stall may occur. In addition, when the fuel rail pressure drops to the low pressure fuel pump outlet pressure, fuel atomization, vaporization, and/or charge preparation can degrade. Overall, engine startability is degraded.

As elaborated with reference to FIGS. 4-5, if the high pressure fuel pump is degraded, an engine controller may be configured to shift fuel injection into a first firing cylinder (and/or a selected number of combustion events since an engine restart) from the compression stroke to an intake stroke. By performing intake stroke direct fuel injection for at least the first firing cylinder (and/or the selected number of combustion events since the engine restart), the likelihood of a successful engine restart, while a high pressure fuel pump is degraded, can be increased. By resuming compression injection after intake stroke injection into the first firing cylinder (and/or the selected number of combustion events since the engine restart), the higher air-charge temperature and higher valve temperature of the engine cylinders during the compression stroke may be advantageously used to more effectively evaporate the directly injected fuel. In particular, for fuels with a relatively low volatility (such as alcohol fuels), the subsequent compression stroke injection may allow the fuel to be exposed to higher air-charge temperatures, thereby better enabling efficient evaporation and formation of a homogenous air-fuel mixture. As also elaborated in FIGS. 4-5, intake stroke direct fuel injection may be used for the first firing cylinder during an engine cold start irrespective of the state of the high pressure fuel pump. Subsequently, intake stroke injection may be continued for a selected number of combustion events since the engine restart if the high pressure fuel pump is degraded. Alternatively, compression stroke injection may be resumed for the selected number of combustion events since the engine restart if the high pressure fuel pump is not degraded. Herein, most of the injected fuel may be better evaporated, less fuel may be lost during engine operation, and the need for larger or pilot fuel injections at an engine cold-start may be reduced. This may provide fuel economy benefits as well as reduced cold-start exhaust emissions.

Returning to FIG. 3, controller 332 may receive various signals from sensors coupled to fuel system 300 and engine 324. For example, controller 332 may receive a fuel pressure (and/or temperature) signal from fuel sensor 326 which may be positioned downstream of high-pressure fuel pump 310 (e.g. positioned in fuel line 314). In some cases, fuel pressure measured by fuel sensor 326 may be indicative of fuel rail pressure. In some embodiments, a fuel sensor may be positioned upstream from high-pressure fuel pump 310 to measure a pressure of fuel exiting low-pressure fuel pump 302. Further, controller 332 may receive engine/exhaust parameter signals from engine sensor(s) 328. For example, these signals may include measurement of inducted mass air flow, engine coolant temperature, engine speed, throttle position, and absolute manifold pressure, emission control device temperature, etc. Note that various combinations of the above measurements as well as measurements of other related parameters may be sensed by sensor(s) 328.

Controller 332 may provide feedback control based on signals received from the various fuel sensors 326, and engine sensor(s) 328. For example, controller 332 may send signals to adjust a current level or pulse width of a mechanical solenoid valve (MSV) of high-pressure fuel pump 310 to adjust operation of high-pressure fuel pump 310, a fuel pressure set-point of fuel pressure regulator 310, and/or a fuel injection amount and/or timing based on signals from fuel sensor 326, and engine sensor(s) 328.

In one example controller 332 is a microcomputer that includes a microprocessor unit, input/output ports, an electronic storage medium for executable programs and calibration values such as read only memory, random access memory, keep alive memory, and a data bus. The storage medium read-only memory can be programmed with computer readable data representing instructions executable by the processor for performing the method described below as well as other variants that are anticipated but not specifically listed.

Controller 332 can also control the operation of each of fuel pumps 302 and 310 to adjust an amount, pressure, flow rate, etc., of a fuel delivered to the engine. As one example, controller 332 can vary a pressure setting and/or fuel flow rate of the fuel pumps to deliver fuel to different locations of the fuel system. In one example, where the high pressure fuel pump is a volumetric displacement fuel pump, the controller may adjust a flow control valve of the high pressure pump to vary the effective pump volume of each pump stroke.

In this way, the components of FIGS. 1-3 enable a method of operating an engine wherein during an engine cold start condition, fuel may be direct injected into a first firing cylinder during an intake stroke independent of a state of the high pressure fuel pump coupled to the engine to restart the engine. In this way, sufficient pressure may be generated to crank the engine, thereby improving engine startability.

Now turning to FIG. 4, an example routine 400 is shown for adjusting engine operations, including fuel injection, during an engine cold start, based on whether or not a high pressure fuel pump of the fuel system is degraded.

At 402, engine operating conditions may be estimated and/or measured. These may include, for example, torque demand, engine temperature, exhaust catalyst temperature, desired boost level, etc. Next at 404, it may be determined if engine cold start conditions are confirmed. In one example, an engine cold start condition may be determined upon confirmation of one or more of an exhaust catalyst temperature being below a threshold temperature, and the engine being in an engine-off condition for greater than a threshold time.

If engine cold-start conditions are confirmed, then at 406, the routine includes, during the engine cold start condition, direct injecting fuel into a first firing cylinder during an intake stroke independent of a state of a high pressure fuel pump coupled to the engine system. That is, fuel may be direct injected into the first firing cylinder during the intake stroke if the high pressure fuel pump is not degraded, and fuel may be direct injected into the first firing cylinder during the intake stroke if the high pressure fuel pump is degraded. As used herein, the intake stroke injection may include injecting fuel as a single injection during the intake stroke. As such, the first firing cylinder may be selected based on piston position. For example, the first firing cylinder may be a first cylinder that reaches TDC after the engine begins to rotate. By injecting in the intake stroke irrespective of the state of the high pressure fuel pump, fuel vaporization and air-fuel mixing can be improved to reduce exhaust emissions before the exhaust catalyst is active (e.g., at or above the catalyst light-off temperature).

Next, at 408, it may be determined if the high pressure fuel pump (HPP) is degraded. In one example, high pressure pump degradation may have been identified during a preceding engine cycle (e.g., immediately preceding cycle) by performing appropriate diagnostic routines. As such, if the high pressure pump is degraded, compression stroke fuel injection may not be performed efficiently. Specifically, the reduced pressure level in the fuel line may not be sufficient to force fuel into a cylinder during a compression stroke. Thus, based on whether or not the high pressure fuel pump is degraded, the routine may include either continuing direct injecting fuel in the intake stroke during the restart, or shifting to the compression stroke, for a number of combustion events since the engine restart.

Specifically, if the high pressure fuel pump is not degraded, then at 410, the routine includes resuming compression injection of fuel during the restart. Therein, fuel may be direct injected in the compression stroke as multiple injections (herein, also referred to as a split injection). By injecting fuel in the compression stroke, the higher air-charge temperature and higher valve temperature of the engine cylinders during the compression stroke may be advantageously used to more effectively evaporate the directly injected fuel. By enabling efficient evaporation and formation of a homogenous air-fuel mixture, engine startability can be enhanced. At 412, one or more engine operating parameters may be adjusted based on the compression stroke injection to reduce an engine restart speed flare. These may include, for example, a spark ignition timing, an alternator load, a throttle position, a valve timing, a cam timing, etc. The various engine operating parameters may be adjusted to reduce an engine restart speed flare, to reduce NVH issues, and improve smoothness of vehicle launch in engine configured to perform idle-stops. For example, spark timing may be retarded by a larger amount (e.g., by −25 to −30 if late compression injection is used vs. −10 to −15 CA deg if intake injection is used). As such, a larger amount of spark retard may be tolerated when fuel is injected in the compression stroke relative to the intake stroke. As another example, a larger alternator load may be applied on the engine until a threshold engine speed is reached (such as an engine idling speed). As yet another example, the throttle may be at least partially opened (or maintained more open) until the threshold speed is reached during the engine restart. Still other adjustments to valve timing, cam timing, etc. may be performed.

In one example, the compression stroke injections may be continued at least until a threshold speed (e.g., an engine idling speed) is reached. Accordingly, at 418, it may be confirmed if the threshold engine speed has been reached. Upon confirming that the threshold engine speed has been reached, at 420, the routine may transition to a fuel injection timing that is based at least on engine speed and load conditions.

Returning to 408, if the high pressure fuel pump is degraded, then at 414, the routine includes continuing to direct inject fuel during the intake stroke for a number of combustion events since the engine restart. Therein, fuel may continue to be injected in the intake stroke as a single fuel injection. By continuing to inject fuel in the intake stroke, the engine restart speed flare may be better addressed in the absence of the high pressure fuel pump. The number of combustion events over which the intake stroke injection is continued may be based on the indication of high pressure fuel pump degradation. For example, in response to the indication of degradation, intake stroke combustion may be continued beyond the first firing cylinder, and into the first four firing cylinders. As another example, the number of combustion events over which the intake stroke injection is continued may be further based on the engine cylinder configuration. For example, intake stroke combustion may be continued beyond the first firing cylinder, and into the first four firing cylinders, for a four-cylinder engine, but into the first six cylinders for a six-cylinder engine, and so on. In still another example, the number of combustion events may be based on an engine speed such that the direct injecting in the intake stroke is continued for a number of combustion events until an engine speed is at or above a threshold speed (such as, an engine idling speed).

Next, at 416, one or more engine operating parameters may be adjusted based on the intake stroke injection to assist in reducing an engine restart speed flare. For example, while direct injecting fuel during the intake stroke, an ignition spark timing may be adjusted based on the direct injection. Since a larger amount of spark retard is possible with a compression stroke injection relative to an intake stroke injection, herein, spark timing may be retarded by a smaller amount while direct injecting in the intake stroke. As another example, while direct injecting fuel during the intake stroke, the controller may apply an alternator load on the engine, the alternator load based on one or more of combustion event number, and speed profile (e.g., desired speed profile and/or desired acceleration profile). Specifically, a smaller alternator load may be applied on the engine (relative to the larger alternator load applied during the compression stroke injection) until a threshold engine speed is reached (such as an engine idling speed). As yet another example, the throttle may be maintained closed (or less open relative to the throttle opening used during a compression stroke injection) until the threshold speed is reached during the engine restart. Still other adjustments to valve timing, cam timing, etc. may be performed. In one example, an intake and/or exhaust valve timing of the first firing cylinder (at 406) as well as the subsequent firing cylinders undergoing intake stroke injection, may be adjusted so that the intake stroke direct fuel injection occurs during positive valve overlap. By injecting the fuel during positive valve overlap, further improvements in air-fuel mixing may be achieved.

For example, in engines configured to be selectively shut-down in response to engine idle-stop conditions, and restarted in response to engine restart conditions, a base CAM timing may be typically set to have minimal positive overlap and a small amount of negative overlap (e.g., 8 CA deg of negative overlap). The small amount of negative overlap may reduce the potential for exhaust gasses, (that is, residuals) from flowing into the intake manifold during an engine shutdown. Cam timing adjustments may also be a function of the intake manifold pressure near the end of shutdown. Thus, as the engine speed approaches zero, the throttle may be held closed from the beginning of shutdown. As an example, the throttle may be opened as a function of engine speed, e.g. at 300 RPM, during shutdown to reduce the exhaust gas transfer. As such, positive valve overlap may provide further advantages during cold start for engines that run on alcohol fuels, such as on E85-E100 fuels. For example, in engines configured with idle-stop, if the engine is "warmed-up", engine stability with E85 as a fuel may be improved. The intake stroke injection and accompanying engine operating parameter adjustments (e.g., adjustments to spark retard, alternator load, valve timing, throttle position, etc.) may be maintained for a number of combustion events until a threshold engine speed is reached. For example, until an engine idling speed is attained. At 418 it may be confirmed if the threshold engine speed has been reached. Upon confirming that the threshold engine speed has been reached, at 420, the routine may transition to a fuel injection timing that is based at least on engine speed and load conditions.

In this way, by injecting fuel into a first firing cylinder during an intake stroke, when performing an engine cold start, fuel vaporization and air-fuel mixing can be improved to reduce exhaust emissions before the exhaust catalyst is activated (e.g., at or above the catalyst light-off temperature). As such, substantial air-fuel mixing may be required when the engine is spinning relatively slowly (such as when an engine restart is initiated). Thus, by injecting fuel in the intake stroke, more time is allowed for the fuel to vaporize, and for the air charge to mix with the fuel. By performing intake stroke injections when a high pressure fuel pump is degraded, air-fuel mixing and fuel atomization can be enabled even at relatively lower fuel rail pressures.

Now turning to FIG. 5, an example routine 500 is shown for adjusting engine operations, including fuel injection, during an engine restart from idle-stop conditions, based on whether or not a high pressure fuel pump of the fuel system is degraded.

At 502, engine idle-stop conditions may be confirmed. These may include, for example, verifying that the engine is operating (e.g., carrying out combustion), the battery state of charge is more than a threshold (e.g. more than 30%), vehicle running speed is within a desired range (e.g., no more than 30 mph), air conditioning is not desired, engine temperature is within a selected temperature range, a start has not been requested by the vehicle driver, driver requested torque is less than a predetermined threshold value, brake pedal has been pressed, etc. As such, any or all of the idle-stop conditions may be met for an idle-stop condition to be confirmed.

If idle-stop conditions are not met, the method may end. However, if any or all of the idle-stop conditions are met, then at 504, the controller may initiate execution of an idle-stop operation and proceed to deactivate the engine. As such, this may include shutting off fuel and/or spark to the engine.

Next, at 506, it may be determined if a high pressure fuel pump of the fuel system is degraded. In one example, degradation of the high pressure fuel pump may have been diagnosed during a previous engine drive cycle.

If the high pressure fuel pump is not degraded, then at 508, during a first engine shutdown (preceding a first engine restart), the routine includes shutting down the engine while maintaining one or more transmission clutches engaged. In comparison, if the high pressure fuel pump is not degraded, then at 510, during a second engine shutdown (preceding a second engine restart), the routine includes shutting down the engine while maintaining the one or more transmission clutches disengaged.

Returning to 508, after shutting down the engine, at 511, restart conditions may be confirmed. These may include, for example, verifying that the engine is in idle-stop (e.g., not carrying out combustion), the battery state of charge is less than a threshold (e.g. less than 30%), vehicle running speed is within a desired range (e.g., less than 30 mph), air conditioning is desired, a start has not been requested by the vehicle driver, driver requested torque is more than a predetermined threshold value, brake pedal has been released, etc. If restart conditions are not met, then at 532, the engine may then be maintained in idle-stop until restart conditions are satisfied.

As such, during an engine restart from idle-stop, an exhaust catalyst may be sufficiently warm and active (e.g., a temperature of the exhaust catalyst may be at or above a light-off temperature). However, there may be conditions when the exhaust catalyst is not sufficiently warmed. Thus, after confirming restart conditions, at 512, an exhaust catalyst temperature (Tcat) may be estimated and/or measured and it may be determined if the exhaust catalyst temperature is at or above a threshold temperature (such as a catalyst light-off temperature). If the catalyst temperature is above the threshold temperature, then at 514, during a first engine restart from idle-stop when the high pressure fuel pump is not degraded, the routine includes direct injecting fuel as multiple injections into a first firing cylinder during a compression stroke (that is, as a split compression injection). In one embodiment, the compression stroke injection may be continued into a first number of firing cylinders. Specifically, during the first engine restart, the direct injecting may include direct injecting during the compression stroke for a first larger number of combustion events since the engine restart. The first number of combustion events may be based at least on the configuration of the engine. For example, the number of combustion events may range between Num_cyl/2 to Num_cyl where Num_cyl refers to the number of cylinders in the engine. As an example, on an I4 engine, the first number of combustion events may vary from 2 to 4. The number of combustion events over which the multiple compression stroke injections are performed may also be based on a trade-off between engine restart robustness relative to exhaust emissions, in particular smoking For example, the number of compression injection events may be selected as the number of combustion events required to pump down the intake manifold to an idle MAP value of ~35-45 KPa. As such, this assures that compression injection will be used while there is a need to use higher spark retard to minimize the engine flare. In some manual transmission applications, a single compression injection event can be used if a greater amount of engine flare can be tolerated or if the engine inertia is high enough that spark retard is not required to suppress the flare.

Next, at 515-520, various engine operating parameters may be adjusted based on the compression injection. Specifically, at 515, during the first engine restart, spark timing may be retarded by a first larger amount (e.g., −25 CA deg) while direct injecting fuel in the compression stroke. At 516, a first, larger alternator load may be applied on the engine until a threshold engine speed (e.g., an idling engine speed) is reached. At 518, an intake air throttle may be maintained, or held, closed (that is, less open) for a number of combustion events during the run-up. By adjusting the various engine operating parameters based on the compression injection, engine speed overshoot at restart and restart NVH issues may be reduced. Additionally, launch smoothness of the vehicle may be improved.

At 520, the routine further includes not disabling an automatic engine shut-down responsive to idle-stop conditions following the first engine restart. That is, since the high pressure pump is functional, engine idle-stop operations may be enabled.

As such, the compression stroke injections may be continued until a threshold engine speed is reached (such as an engine idling speed). Thereafter, fuel injection timing may be adjusted based on engine operating conditions including engine speed and load conditions.

Returning to 512, if the exhaust catalyst temperature at the onset of the engine restart is not above the threshold temperature (that is, the catalyst is not sufficiently warmed), then at 513, the routine includes, during the engine restart from idle-stop, injecting fuel into at least a first firing cylinder in the intake stroke. From there, the routine may proceed to 514 and resume compression injection. In one example, the controller may inject fuel into the first firing cylinder as a single intake stroke injection and inject fuel into subsequent firing cylinders as multiple compression stroke injections. In another example, the controller may inject fuel into a selected number of firing cylinders (or a selected number of combustion events since the engine restart) as a single intake stroke injection, until the exhaust temperature is at or above the threshold temperature, and then resume fuel injection as multiple compression stroke injections until the engine speed is at or above a threshold engine speed. Then, after the engine speed is at or above the threshold engine speed (and above the threshold catalyst temperature), fuel injection timing may be adjusted based on engine operating conditions including engine speed and load conditions.

As such, while injecting fuel in the intake stroke, the various engine operating parameters (e.g., throttle opening, valve timing, spark timing, alternator load, etc.) may be adjusted based on the intake stroke injection, rather than the compression stroke injection. As further elaborated below, this may include, during the intake stroke injection, applying a smaller amount of spark retard, a smaller amount of alternator load, a larger throttle opening, more valve overlap, etc. By injecting fuel in the intake stroke when an exhaust catalyst is not sufficiently warm, more time may be allowed for fuel vaporization and fuel-air charge mixing, reducing engine restart exhaust emissions during cold catalyst conditions.

Returning to 510, after shutting down the engine, at 521, restart conditions may be confirmed. If restart conditions are not met, then at 532, the engine may then be maintained in idle-stop until restart conditions are satisfied.

If restart conditions are confirmed, then at 522, during a second engine restart from idle-stop, when the high pressure fuel pump is degraded, the routine includes direct injecting fuel as a single injection into the first cylinder during an intake stroke. In one embodiment, the intake stroke injection may be continued into a second number of firing cylinders. Specifically, during the second engine restart, the direct injecting may include direct injecting during the intake stroke for a second smaller number of combustion events since the engine restart.

It will be appreciated that while the example of FIG. 5 illustrates the first engine restart with multiple compression injections performed over a first larger number of combustion events since the restart and with the second engine restart with single intake stroke injection performed over a second smaller number of combustion events since the engine restart, this is not meant to be limiting. In alternate examples, based on engine operating conditions and the engine configuration, the first engine restart may include compression injections performed over the same number of combustion events as the number of combustion events over which the intake injections of the second engine restart are performed. Further still, the first engine restart may include compression injections performed over a first number of combustion events larger than the second number of combustion events over which the intake injections of the second engine restart are performed.

Next, at 524-530, various engine operating parameters may be adjusted based on the intake stroke injection. Specifically, at 524, during the second engine restart, spark timing may be retarded by a second smaller amount while direct injecting fuel in the intake stroke. As an example, spark timing may be shifted to an absolute value of 10 CA degrees BTDC. At 526, a second, smaller alternator load may be applied on the engine until a threshold engine speed (e.g., an idling engine speed) is reached. That is, the alternator load may be minimized until after the engine speed has crossed the target idle speed. At 528, an intake air throttle may be released so that is it more open for a number of combustion events during the run-up. By adjusting the various engine operating parameters based on the compression injection, engine speed overshoot at restart and restart NVH issues in the absence of a functional high pressure pump may be reduced. Additionally, launch smoothness of the vehicle in the presence of a degraded high pressure pump may be improved.

As such, the intake stroke injections may be continued until a threshold engine speed is reached. For example, until an engine idling speed is reached. Thereafter, fuel injection timing may be adjusted based on engine operating conditions including engine speed and load conditions.

At 530, the routine further includes disabling an automatic engine shut-down responsive to idle-stop conditions following the second engine restart. That is, since the high pressure pump is degraded, further engine idle-stop operations may be disabled. By disabling engine idle-stops, reduced engine startability on subsequent engine restarts, arising from the high pressure pump degradation, can be better addressed.

FIG. 6 depicts an example fuel injection timing chart 600 with example variations in injection settings for fuel injected in a first firing cylinder during an engine restart in the presence or absence of high pressure fuel pump degradation.

In one example, when operating the engine while the high pressure pump is functional, fuel may be injected into a first firing cylinder during the compression stroke (solid bars) as multiple injections (herein, depicted as two injections of equal amount). An average timing and net amount of the compression stroke injection may be based on engine operating conditions including engine speed/load conditions, alcohol content of the injected fuel, etc. To reduce potential issues associated with the increased fuel rail pressure available in the presence of a functional high pressure fuel pump, such as fuel hitting the cylinder walls and/or the piston surface, multiple compression injections may be performed. It will be appreciated that while the depicted example illustrates the compression injection as symmetric double compression injection, this is not meant to be limiting. In alternate examples, a larger number of injections may be possible which may be arranged to be symmetric or asymmetric. Likewise, a timing between the injections as well as a time of opening and closing of the fuel injectors may be adjusted based on engine operating conditions (such as an alcohol content of the fuel). Herein, injection timing may be retarded into the compression stroke to take advantage of the compression stroke's higher cylinder valve temperature and aircharge temperature, thereby improving engine restartability.

In another example, when operating the engine while the high pressure pump is degraded, fuel may be injected into the first firing cylinder during the intake stroke as a single injection (hatched bar). A timing and amount of the intake stroke injection may be based on engine operating conditions including engine speed/load conditions. Herein, injection timing may be advanced into the intake stroke to use the reduced fuel rail pressure for injecting fuel into the first firing cylinder, thereby improving engine restartability even when the high pressure pump is degraded.

In this way, during an engine restart, when sufficiently high fuel rail pressures are not available due to high pressure fuel pump degradation, fuel may be injected into an intake stroke to improve cylinder combustion and engine cranking By continuing intake stroke injection until a threshold engine speed is reached, engine startability can be improved, and the likelihood of engine stalls due to high pressure pump degradation can be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first engine restart from idle-stop, when a high pressure fuel pump is not degraded, direct injecting fuel as multiple injections into a first cylinder during a compression stroke; and
during a second engine restart from idle-stop, when the high pressure fuel pump is degraded, direct injecting fuel as a single injection into the first cylinder during an intake stroke.

2. The method of claim 1, wherein during the first engine restart, the direct injecting includes direct injecting during the compression stroke for a first, larger number of combustion events since the restart, and during the second engine restart, the direct injecting includes direct injecting during the intake stroke for a second, smaller number of combustion events since the restart.

3. The method of claim 1, further comprising, during the first engine restart, retarding spark timing by a first, larger amount while direct injecting fuel, and during the second engine restart, retarding spark timing by a second, smaller amount while direct injecting fuel.

4. The method of claim 1, further comprising, during the first engine restart, applying a first, larger alternator load on the engine until a threshold engine speed is reached, and during the second engine restart, applying a second, smaller alternator load on the engine until the threshold engine speed is reached.

5. The method of claim 1, further comprising, during the first engine restart, maintaining an intake throttle open for a number of combustion events, and during the second engine restart, maintaining the intake throttle less open for the number of combustion events.

6. The method of claim 1, further comprising, disabling an automatic engine shut-down responsive to idle-stop conditions following the first engine restart.

7. The method of claim 1, further comprising, during a first engine shutdown preceding the first engine restart, shutting down the engine while maintaining one or more transmission clutches engaged; and during a second engine shutdown preceding the second engine restart, shutting down the engine while maintaining the one or more transmission clutches disengaged.

8. An engine system, comprising:
an engine configured to be selectively deactivated responsive to idle-stop conditions;
a fuel injector configured to directly inject fuel into an engine cylinder;
a first high pressure fuel pump and a second low pressure fuel pump configured to deliver fuel from a fuel tank to the injector;
a controller with computer readable instructions for:
during an engine restart from idle-stop,
in response to degradation of the first fuel pump, shifting direct fuel injection into a first firing engine cylinder from a compression stroke to an intake stroke for a number of combustion events since the restart and wherein the shifting includes shifting fuel injection from a multiple fuel injection in the compression stroke to a single fuel injection in the intake stroke.

9. The system of claim 8, wherein the first firing cylinder is a first cylinder to reach TDC upon engine restart.

10. The system of claim 8, further comprising an alternator, wherein the controller includes further instructions for applying a reduced alternator load on the engine during the restart until a threshold speed is reached.

* * * * *